US012721356B2

(12) United States Patent
Kritzman et al.

(10) Patent No.: US 12,721,356 B2
(45) Date of Patent: Sep. 1, 2026

(54) FISH FILLETING STAND DEVICE

(71) Applicants: Marilyn Kritzman, Kalamazoo, MI (US); Anthony Tate, Grand Rapids, MI (US)

(72) Inventors: Marilyn Kritzman, Kalamazoo, MI (US); Anthony Tate, Grand Rapids, MI (US)

( * ) Notice: Subject to any disclaimer, the term of this patent is extended or adjusted under 35 U.S.C. 154(b) by 0 days.

(21) Appl. No.: 19/225,538

(22) Filed: Jun. 2, 2025

(65) Prior Publication Data

US 2025/0287964 A1 Sep. 18, 2025

Related U.S. Application Data

(63) Continuation-in-part of application No. 18/399,316, filed on Dec. 28, 2023, now Pat. No. 12,342,832.

(51) Int. Cl.
*A22C 25/08* (2006.01)
*A22C 25/16* (2006.01)

(52) U.S. Cl.
CPC .............. *A22C 25/08* (2013.01); *A22C 25/16* (2013.01)

(58) Field of Classification Search
CPC ....... A22C 25/06; A22C 25/02; A22C 25/025; A22C 25/96; A47B 5/06
USPC .................................................. 452/194–196
See application file for complete search history.

(56) References Cited

U.S. PATENT DOCUMENTS 3,093,859 A * 6/1963 Cooper ................ A22C 25/025 452/195
3,445,885 A * 5/1969 Reitz ...................... A22C 25/06 452/195
3,503,094 A * 3/1970 Kennedy ............. A22C 25/025 452/195
3,713,188 A * 1/1973 Holladay ............... A22C 25/06 452/196
4,217,817 A * 8/1980 Meamber .............. A47J 37/067 452/144
4,229,858 A 10/1980 Baxter
4,253,650 A * 3/1981 Kuzio .................... A22C 25/08 452/149
4,977,644 A * 12/1990 Evans .................... A22C 25/06 452/132
5,376,043 A * 12/1994 Carter .................... A22C 25/06 452/65
5,522,765 A * 6/1996 Dotson .................. A22C 25/06 452/194
5,609,521 A 3/1997 Allred
5,706,740 A 1/1998 Keller, Jr.
7,059,952 B1 * 6/2006 McRoberts ............ A22C 25/06 452/105
7,207,132 B1 * 4/2007 Parsons ................ A01K 97/045 452/194
7,374,479 B2 5/2008 Quinney
9,253,970 B2 2/2016 Carnevali
(Continued)

*Primary Examiner* — Richard T Price, Jr.

(57) ABSTRACT

A fish filleting stand device includes a base panel and a pair of base panel walls extending upwardly from the base panel. The base panel walls are adjustable for a distance between the base panel walls to abut a fish between the base panel walls. A gill post extends upwardly from a base panel top side. A coupler is releasably retains a gill of the fish to the gill post. An extension panel is removably couplable to the base panel such that an extension panel top side abuts and is coplanar with the base panel top side.

18 Claims, 8 Drawing Sheets

(56) References Cited

U.S. PATENT DOCUMENTS

| | | | | |
|---|---|---|---|---|
| 10,827,761 | B1 * | 11/2020 | Graham | A22C 25/06 |
| 2004/0094071 | A1 | 5/2004 | Goeller | |
| 2005/0130575 | A1 * | 6/2005 | Kallas | A22C 25/06<br>452/195 |
| 2006/0252359 | A1 * | 11/2006 | Helbing | A22B 5/06<br>452/194 |
| 2012/0190286 | A1 * | 7/2012 | Redford | A22C 25/16<br>452/195 |

* cited by examiner 26
62
62
64
64
62
62
20
20
24
46
46
56
56
44
44
30
38
38
42
58
58
50

FISH FILLETING STAND DEVICE

CROSS-REFERENCE TO RELATED APPLICATIONS

This application is a continuation in part of application Ser. No. 18/399,316 filed Dec. 28, 2023.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to fish holding devices and more particularly pertains to a new fish holding device for holding a fish to facilitate filleting of the fish.

(2) Description of Related Art Including Information Disclosed Under 37 CFR 1.97 and 1.98

The prior art relates to fish holding devices.

BRIEF SUMMARY OF THE INVENTION

An embodiment of the disclosure meets the needs presented above by generally comprising a base panel and a pair of base panel walls extending upwardly from the base panel. The base panel walls are adjustable for a distance between the base panel walls to abut a fish between the base panel walls. A gill post extends upwardly from a base panel top side. A coupler is releasably retains a gill of the fish to the gill post. An extension panel is removably couplable to the base panel such that an extension panel top side abuts and is coplanar with the base panel top side.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
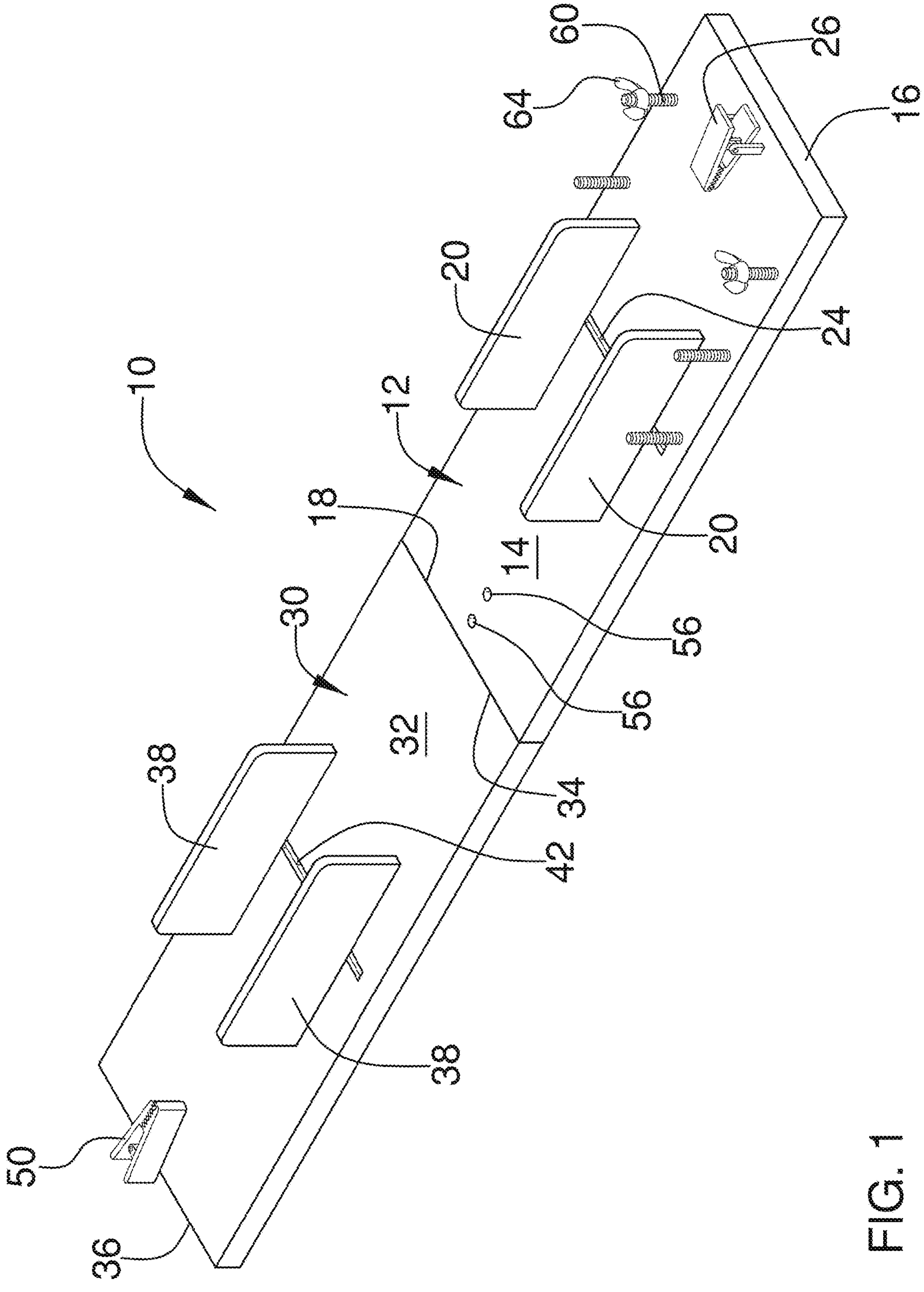
FIG. 1 is a top front side perspective view of a fish filleting stand device according to an embodiment of the disclosure.
Figure 2:
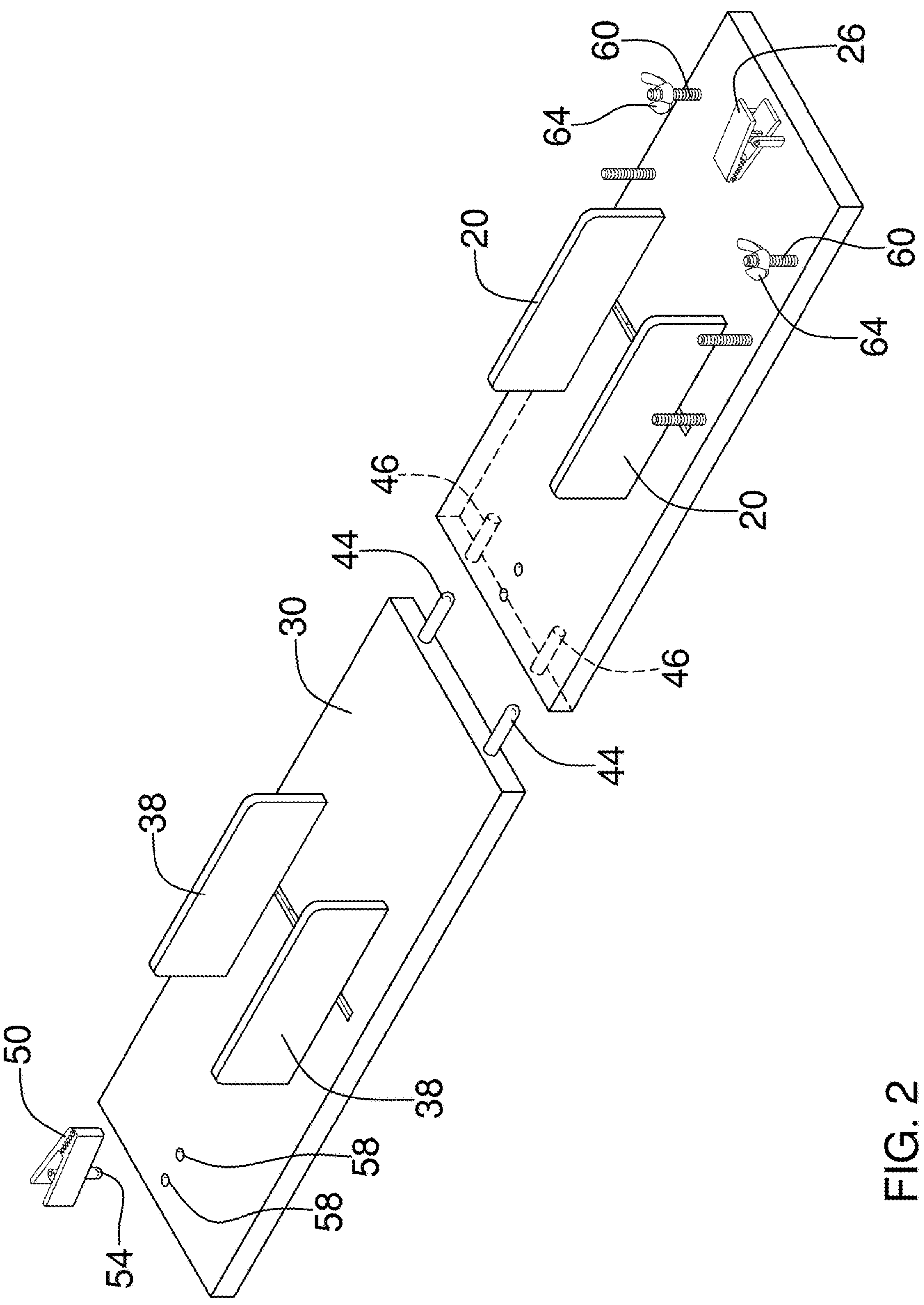
FIG. 2 is a partially exploded top front side perspective view of an embodiment of the disclosure.
Figure 3:
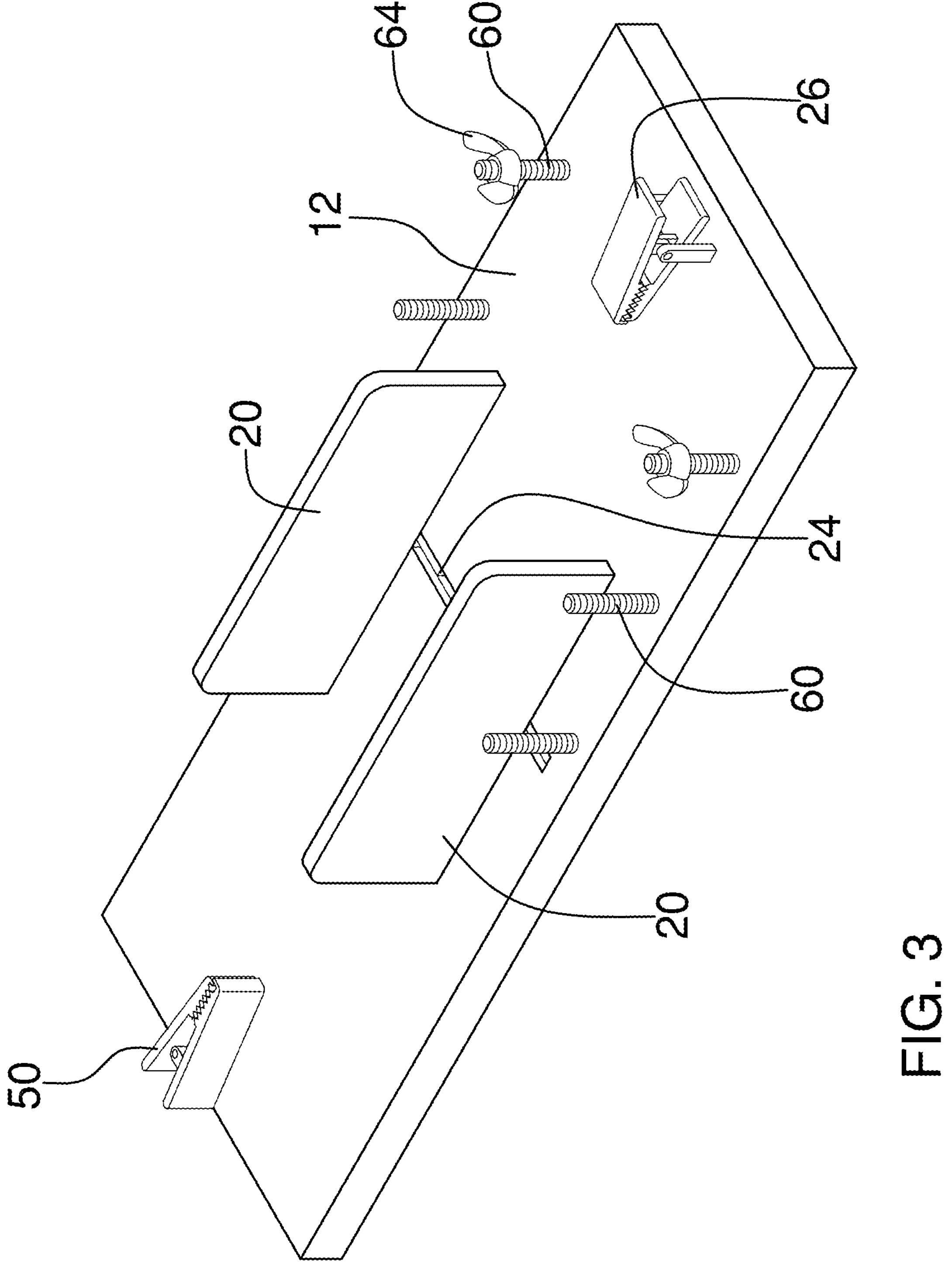
FIG. 3 is a partially exploded top front side perspective view of an embodiment of the disclosure.
Figure 4:
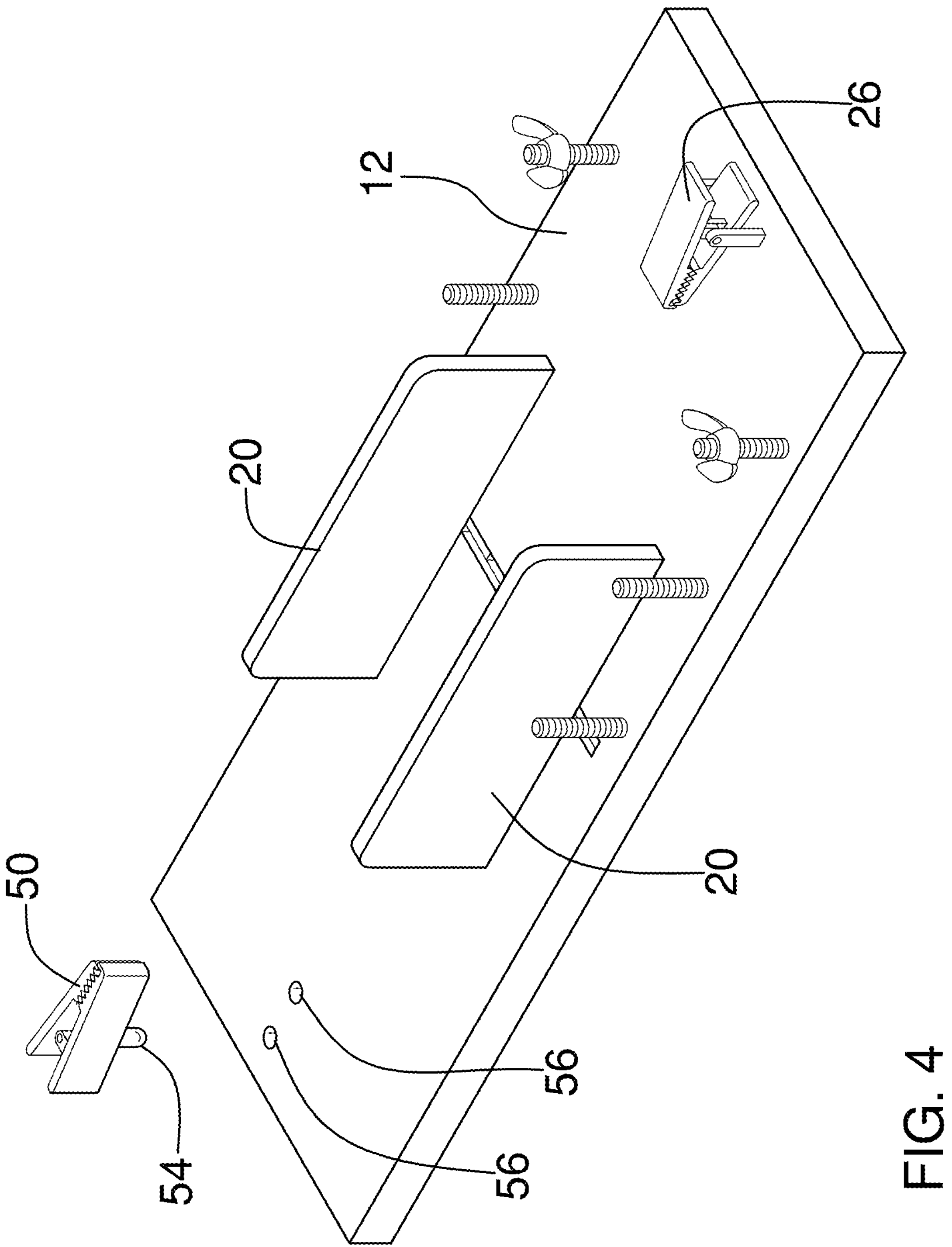
FIG. 4 is a top front side perspective view of an embodiment of the disclosure.
Figure 5:
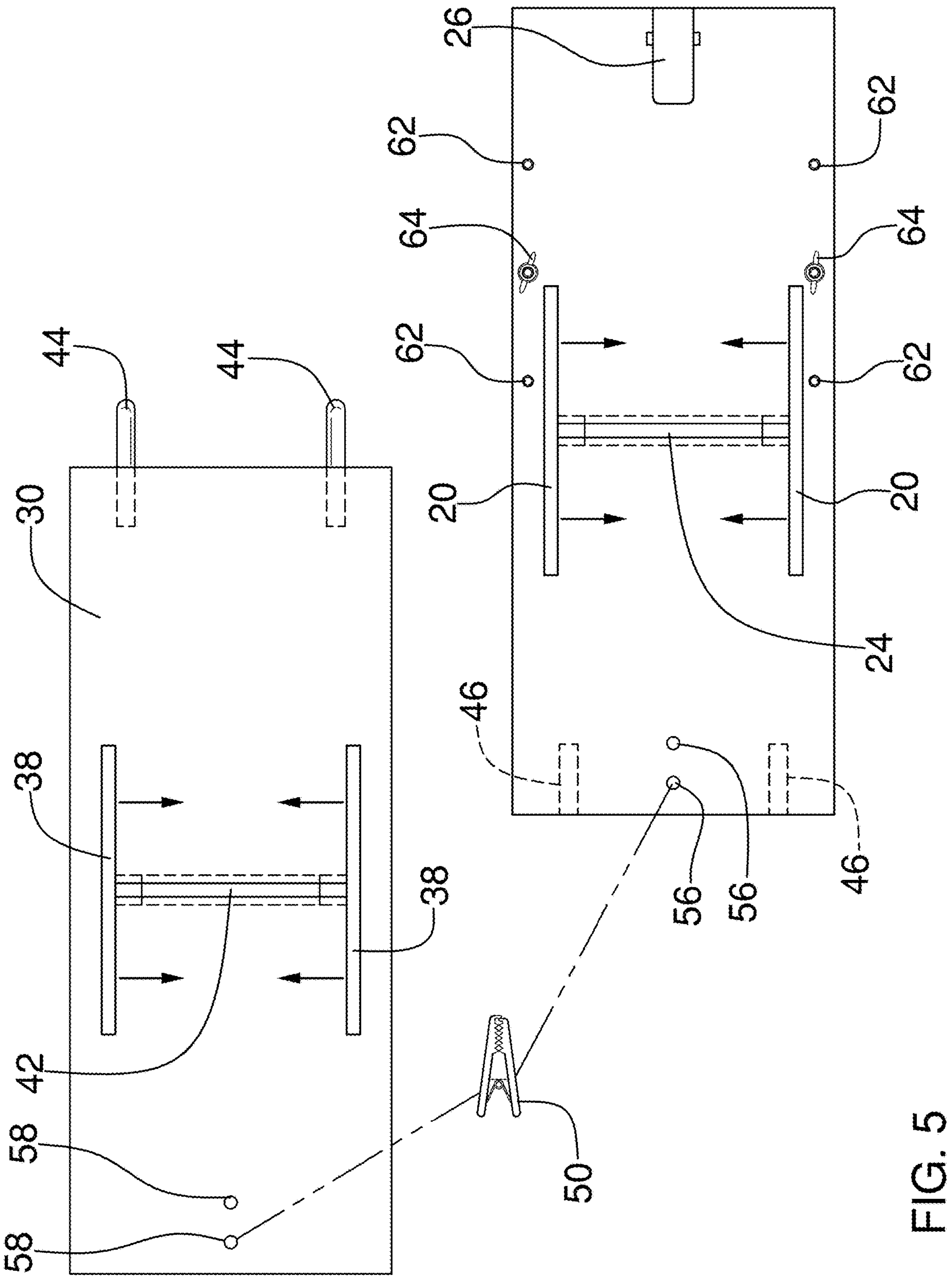
FIG. 5 is a partially exploded top view of an embodiment of the disclosure.
Figure 6:
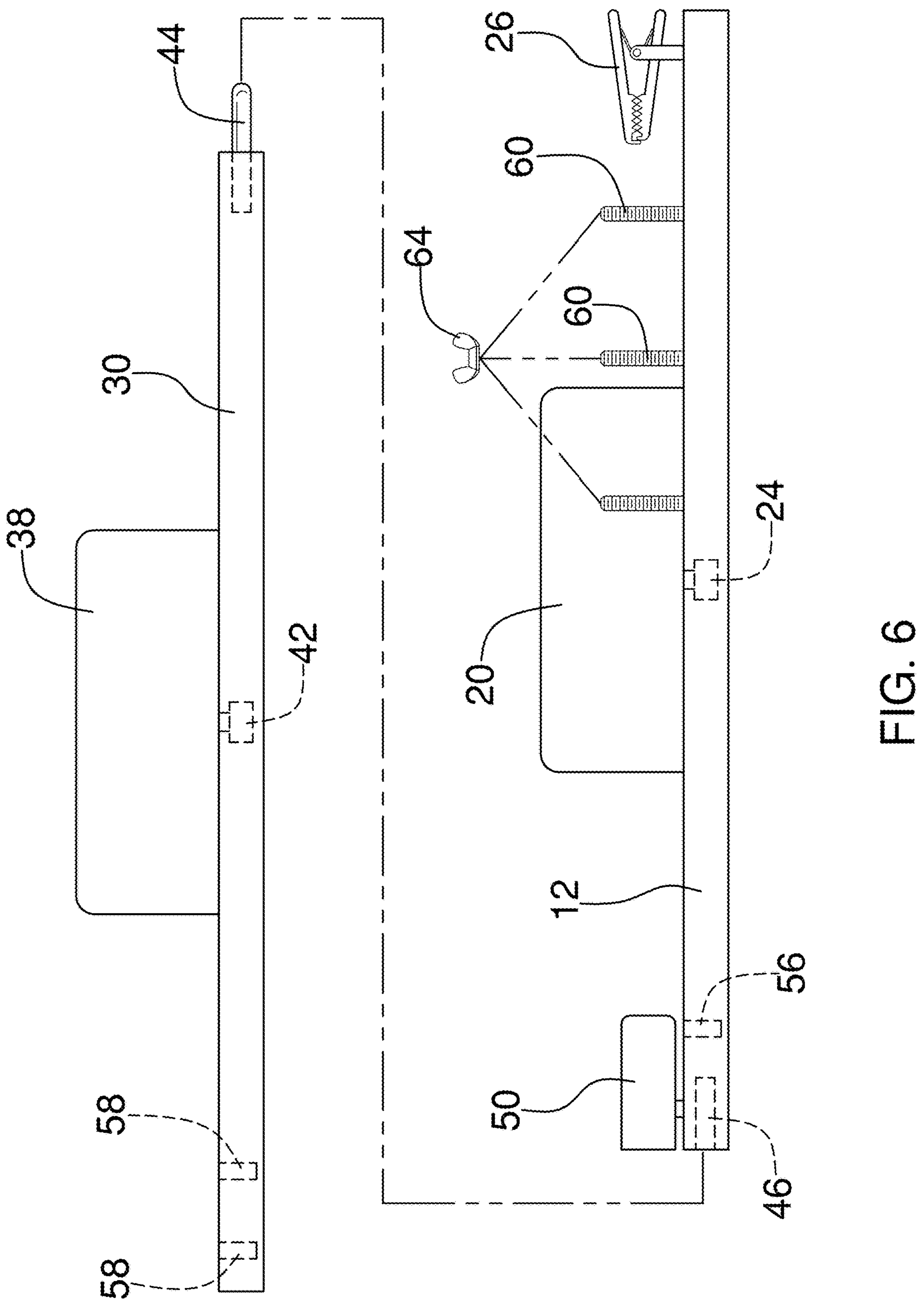
FIG. 6 is a partially exploded side view of an embodiment of the disclosure.
Figure 7:
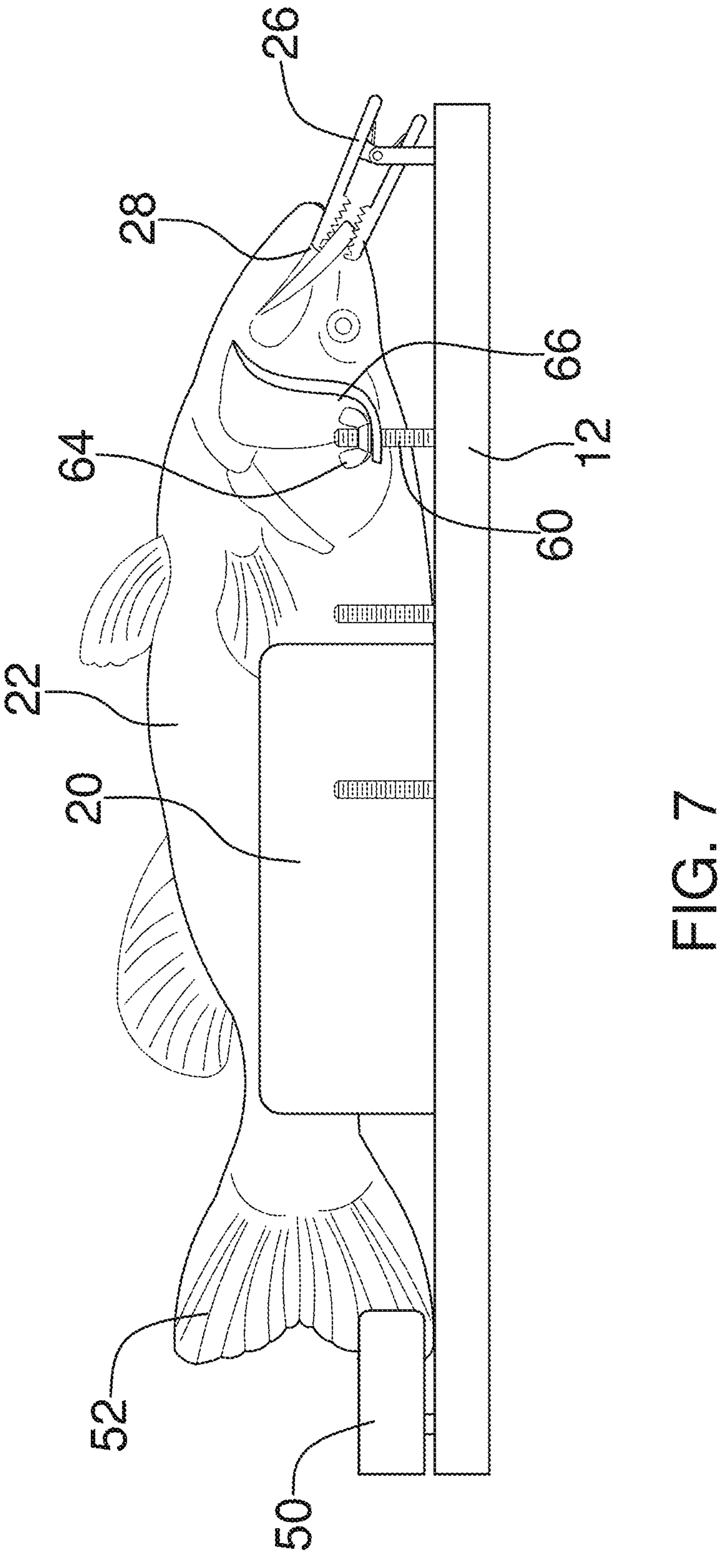
FIG. 7 is a side view of an embodiment of the disclosure in use.
Figure 8:
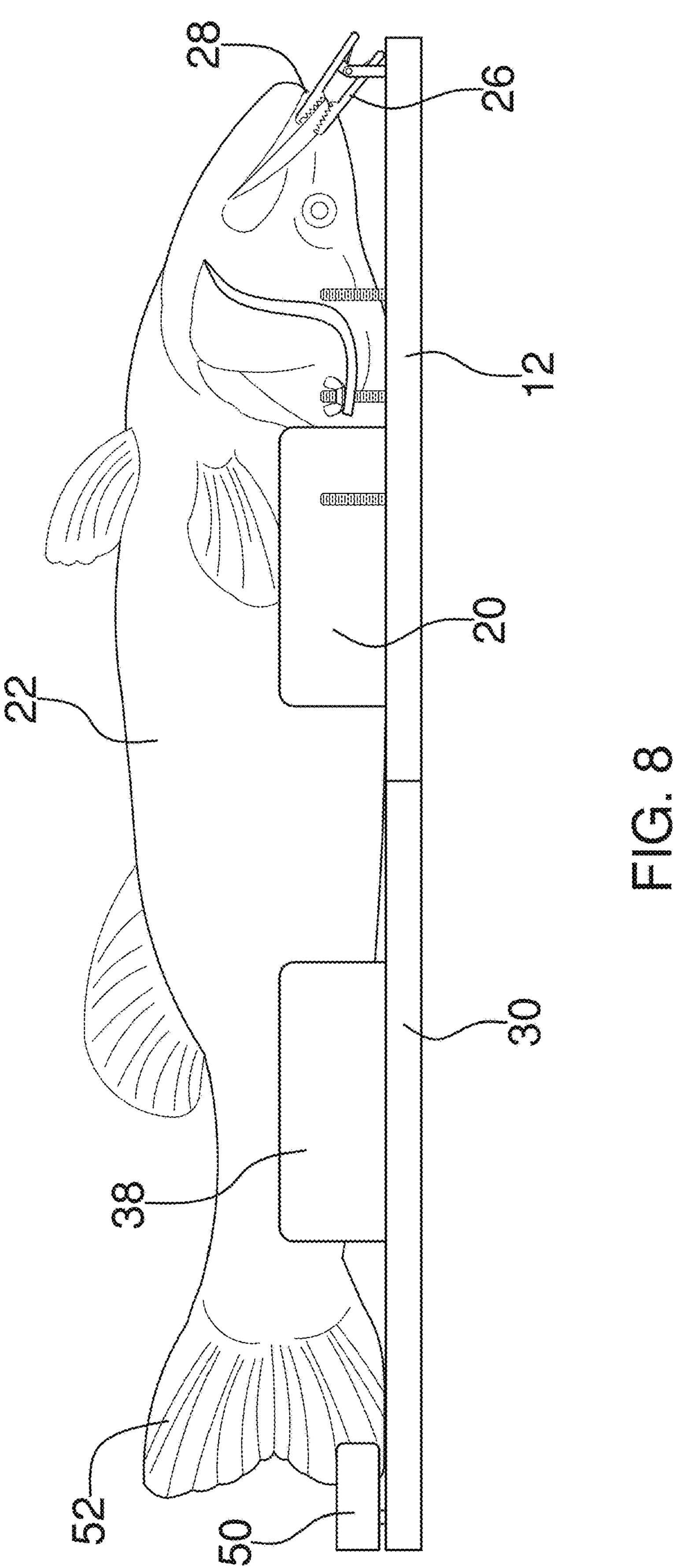
FIG. 8 is a side view of an embodiment of the disclosure in use.

With reference now to the drawings, and in particular to FIGS. 1 through 8 thereof, a new firearm attachment device embodying the principles and concepts of an embodiment of the disclosure and generally designated by the reference numeral 10 will be described.

As best illustrated in FIGS. 1 through 8, the fish filleting stand device 10 generally comprises a base panel 12 having a base panel top side 14 extending between a first base panel end 16 and a second base panel end 18. Each of a pair of base panel walls 20 is movably coupled to and extends upwardly from the base panel 12. Each of the base panel walls 20 is movable such that a distance between the base panel walls 20 is adjustable wherein the distance between the base panel walls 20 is configured to be adjustable to accommodate a fish 22 being positioned on the base panel 12 between the base panel walls 20. The base panel walls 20 are configured to abut the fish 22 when the fish 22 is positioned between the base panel walls 20.

A base panel slot 24 extends into the base panel top side 14. The base panel slot 24 is parallel with the base panel first end 16 and the base panel second end 18. Each of the base panel walls 20 is slidable along the base panel slot 24 to adjust the distance between the base panel walls 20.

A first clip 26 is coupled to the base panel 12 such that the first clip 26 is configured to releasably retain a mouth 28 of the fish 22 when the fish 22 is positioned on the base panel 12. The first clip 26 is openable along a plane parallel to the base panel top side 14.

An extension panel 30 has an extension panel top side 32 extending between an extension panel first end 34 and an extension panel second end 36. The extension panel 30 is removably couplable to the base panel 12 such that the extension panel top side 32 abuts and is coplanar with the base panel top side 14. Each of a pair of extension panel walls 38 is movably coupled to and extends upwardly from the extension panel 30. The extension panel 30 has an extension panel slot 42 extending parallel to the extension panel first end 32 and the extension panel second end 34. Each of the extension panel walls 38 is movable in the extension panel slot 42 such that a distance between the extension panel walls 38 is adjustable. The distance between the extension panel walls 38 is configured to be adjustable to accommodate the fish 22 being positioned on the extension panel 30 between the extension panel walls 38. The extension panel walls 38 are configured to abut the fish 22 when the fish 22 is positioned between the extension panel walls 38.

Each of a plurality of connection pins 44 is coupled to and extends from the extension panel 30. Each of a plurality of sockets 46 extends into the base panel 12. Each of the connection pins 44 is insertable into an associated one of the sockets 46 for coupling the extension panel 30 to the base panel 12. The connection pins 44 may be sized complementary to the sockets 46 such that the extension panel 30 is inhibited from moving too easily away from the base panel 12 but is still relatively easily separable from the base panel 12 when the extension panel 30 is not needed.

A second clip 50 is removably couplable to either one of the base panel 12 and the extension panel 30. The second clip 50 is openable along a plane perpendicular to the base panel top side 14 and the extension panel top side 32 wherein the second clip 50 is configured to releasably retain a tail 52 of the fish 22 when the fish 22 is positioned on the base panel 12, and, when attached to the base panel 12, the extension panel 30. A connection post 54 extends from the second clip 50. Each of a plurality of base panel apertures 56 extends into the base panel top side 14. The connection post 54 is insertable into a selectable one of the base panel apertures 56 such that the second clip 50 is coupled to the base panel 12. The base panel apertures 56 are spaced and aligned perpendicular to the base panel first end 16 and the base panel second end 18 wherein a distance between the base panel first end 16 and the second clip 50 is adjustable. Similarly, each of a plurality of extension panel apertures 58 extends into the extension panel top side 32. The connection post 54 is insertable into a selectable one of the extension panel apertures 58 such that the second clip 50 is coupled to the extension panel 30. The extension panel apertures 58 is spaced and aligned perpendicular to the extension panel first end 32 and the extension panel second end 34 wherein a distance between the extension panel first end 32, or the base panel first end 16, and the second clip 50 is adjustable to accommodate larger fish.

Each of a plurality of pairs of gill posts 60 is linearly aligned parallel to the base panel first end 16. Each of the pairs of gill posts 60 is spaced a unique distance from the base panel first end 16 relative to each other pair of gill posts 60 for different sizes of fish. Each gill post 60 has a height exceeding a height of each of the base panel walls 20. Each of the gill posts 60 is removably coupled to the base panel 12. Laterally aligned pairs of gill post sockets 62 may be provided and spaced for adjusting a position of the pair of gill posts 60 relative to the base panel first end 16. A respective coupler 64 is removably couplable with each gill post 60. The coupler 64 is configured to releasably retain a gill 66 of the fish 22 to the gill post 60 when the fish 22 is positioned on the base panel 12. The coupler 64 has a coupler threading and the gill post 60 has a post threading. The coupler threading is complementary to the post threading such that the coupler 64 is threadably couplable to the gill post 60.

In use, a person would decide if the base panel 12 is sufficient in length to hold the fish 22 or if the extension panel 30 should be attached to the base panel 12. Once determined, the second clip 50 is positioned as desired corresponding to the length of the fish 22. The first clip 26 is engaged to secure the fish 22 and the gills 66 are secured to the gill posts 60, secured by the couplers 64. The base panel walls 20 are adjusted to support the fish 22 in the desired, typically inverted position. When using the extension panel, the extension panel walls 38 are adjusted to abut the fish 22. The second clip 50 is used to secure the tail 52 of the fish 22. Thus, the fish 22 is held in place allowing for easier filleting of the fish 22.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A fish filleting stand device comprising:

a base panel having a base panel top side extending between a first base panel end and a second base panel end;

a pair of base panel walls being movably coupled to and extending upwardly from said base panel, each of said base panel walls being movable such that a distance between said base panel walls is adjustable wherein the distance between said base panel walls is configured to be adjustable to accommodate a fish being positioned on said base panel between said base panel walls, said base panel walls being configured to abut the fish when the fish is positioned between said base panel walls;

a gill post being coupled to said base panel, said gill post extending upwardly from said base panel top side;

a coupler being removably coupleable with said gill post, said coupler being configured to releasably retain a gill of the fish to said gill post when the fish is positioned on said base panel;

an extension panel having an extension panel top side extending between an extension panel first end and an extension panel second end, wherein said extension panel is removably coupleable to said base panel such that said extension panel top side abuts and is coplanar with said base panel top side.

2. The fish filleting stand device of claim 1, wherein said gill post has a height exceeding a height of each of said base panel walls.

3. The fish filleting stand device of claim 1, further comprising a first clip being coupled to said base panel wherein said first clip is configured to releasably retain a mouth of the fish when the fish is positioned on said base panel.

4. The fish filleting stand device of claim 3, wherein said first clip is openable along a plane being parallel to said base panel top side.

5. The fish filleting stand device of claim 3, further comprising a second clip, said second clip being removably coupleable to said base panel.

6. The fish filleting stand device of claim 5, wherein said second clip is openable along a plane being perpendicular to said base panel top side wherein said second clip is configured to releasably retain a tail of the fish when the fish is positioned on said base panel.

7. The fish filleting stand device of claim 5, wherein said second clip is removably coupleable to said extension panel.

8. The fish filleting stand device of claim 5, further comprising:

a connection post extending from said second clip;

a plurality of base panel apertures extending into said base panel top side, said connection post being insertable into a selectable one of said base panel apertures such that said second clip is coupled to said base panel.

9. The fish filleting stand device of claim 8, wherein said base panel apertures are spaced and aligned perpendicular to said base panel first end and said base panel second end wherein a distance between said base panel first end and said second clip is adjustable.

10. The fish filleting stand device of claim 5, further comprising:

a connection post extending from said second clip;

a plurality of extension panel apertures extending into said extension panel top side, said connection post being insertable into a selectable one of said extension panel apertures such that said second clip is coupled to said extension panel.

11. The fish filleting stand device of claim 10, wherein said extension panel apertures are spaced and aligned perpendicular to said extension panel first end and said extension panel second end wherein a distance between said extension panel first end and said second clip is adjustable.

12. The fish filleting stand device of claim 11, further comprising:

a plurality of connection pins coupled to and extending from said extension panel; and a plurality of sockets extending into said base panel, each of said connection pins being insertable into an associated one of said sockets for coupling said extension panel to said base panel.

13. The fish filleting stand device of claim 1, further comprising a base panel slot extending into said base panel top side, said base panel slot being parallel with said base panel first end and said base panel second end, wherein each of said base panel walls is slidable along said base panel slot to adjust the distance between said base panel walls.

14. The fish filleting stand device of claim 1, further comprising a pair of extension panel walls being movably coupled to and extending upwardly from said extension panel, each of said extension panel walls being movable such that a distance between said extension panel walls is adjustable wherein the distance between said extension panel walls is configured to be adjustable to accommodate the fish being positioned on said extension panel between said extension panel walls, said extension panel walls being configured to abut the fish when the fish is positioned between said extension panel walls.

15. The fish filleting stand device of claim 1, the gill post further comprising a plurality of pairs of gill posts, each of said pairs of gill posts being linearly aligned parallel to said base panel first end, each of said pairs of gill posts being spaced a unique distance from said base panel first end relative to each other pair of gill posts.

16. The fish filleting stand device of claim 1, the coupler having a coupler threading, the gill post having a post threading, the coupler threading being complementary to the post threading such that the coupler is threadably couplable coupleable to the gill post.

17. The fish filleting stand device of claim 1, wherein the gill post is removably coupled to the panel.

18. A fish filleting stand device comprising:

a base panel having a base panel top side extending between a first base panel end and a second base panel end;

a pair of base panel walls being movably coupled to and extending upwardly from said base panel, each of said base panel walls being movable such that a distance between said base panel walls is adjustable wherein the distance between said base panel walls is configured to be adjustable to accommodate a fish being positioned on said base panel between said base panel walls, said base panel walls being configured to abut the fish when the fish is positioned between said base panel walls;

a base panel slot extending into said base panel top side, said base panel slot being parallel with said base panel first end and said base panel second end, wherein each of said base panel walls is slidable along said base panel slot to adjust the distance between said base panel walls;

a first clip being coupled to said base panel wherein said first clip is configured to releasably retain a mouth of the fish when the fish is positioned on said base panel, said first clip being openable along a plane being parallel to said base panel top side;

an extension panel having an extension panel top side extending between an extension panel first end and an extension panel second end, wherein said extension panel is removably coupleable to said base panel such that said extension panel top side abuts and is coplanar with said base panel top side;

a pair of extension panel walls being movably coupled to and extending upwardly from said extension panel, each of said extension panel walls being movable such that a distance between said extension panel walls is adjustable wherein the distance between said extension panel walls is configured to be adjustable to accommodate the fish being positioned on said extension panel between said extension panel walls, said extension panel walls being configured to abut the fish when the fish is positioned between said extension panel walls;

a plurality of connection pins coupled to and extending from said extension panel;

a plurality of sockets extending into said base panel, each of said connection pins being insertable into an associated one of said sockets for coupling said extension panel to said base panel;

a second clip, said second clip being removably coupleable to one of said base panel and said extension panel, said second clip being openable along a plane being perpendicular to said base panel top side wherein said second clip is configured to releasably retain a tail of the fish when the fish is positioned on said base panel;

a connection post extending from said second clip;

a plurality of base panel apertures extending into said base panel top side, said connection post being insertable into a selectable one of said base panel apertures such that said second clip is coupled to said base panel, said base panel apertures being spaced and aligned perpendicular to said base panel first end and said base panel second end wherein a distance between said base panel first end and said second clip is adjustable;

a plurality of extension panel apertures extending into said extension panel top side, said connection post being insertable into a selectable one of said extension panel apertures such that said second clip is coupled to said extension panel, said extension panel apertures being spaced and aligned perpendicular to said extension panel first end and said extension panel second end wherein a distance between said extension panel first end and said second clip is adjustable;

a plurality of pairs of gill posts, each of said pairs of gill posts being linearly aligned parallel to said base panel first end, each of said pairs of gill posts being spaced a unique distance from said base panel first end relative to each other pair of gill posts, each said gill post having a height exceeding a height of each of said base panel walls, each of said gill posts being removably coupled to said base panel; and a coupler being removably coupleable with said gill post, said coupler being configured to releasably retain a gill of the fish to said gill post when the fish is positioned on said base panel, the coupler having a coupler threading, the gill post having a post threading, the coupler threading being complementary to the post threading such that the coupler is threadably coupleable to the gill post.

* * * * *